United States Patent
Onandia

Patent Number: 5,471,025
Date of Patent: Nov. 28, 1995

[54] AUTOMATIC WIRE-THREADING DEVICE FOR ELECTROEROSION MACHINES

[76] Inventor: Jose M. Onandia, Eguzkitza, s/n., 48200 Durango, Vizcaya, Spain

[21] Appl. No.: 207,569

[22] Filed: Mar. 4, 1994

[51] Int. Cl.[6] ..................................... B23H 7/10
[52] U.S. Cl. ............................................. 219/69.12
[58] Field of Search ........................... 219/69.12, 69.14

[56] References Cited

U.S. PATENT DOCUMENTS

| | | | |
|---|---|---|---|
| 4,412,118 | 10/1983 | Nomura et al. | 219/69.12 |
| 4,417,118 | 11/1983 | Myano | 219/69.12 |
| 4,547,647 | 10/1985 | Schneider | 219/69.12 |
| 4,609,803 | 9/1986 | Inoue | 219/69.12 |
| 4,778,972 | 10/1988 | Josserand | 219/69.12 |
| 4,814,572 | 3/1989 | Aso et al. | 219/69.12 |
| 4,877,935 | 10/1989 | Aso et al. | 219/69.12 |
| 5,053,598 | 10/1991 | Sakai et al. | 219/69.12 |
| 5,057,663 | 10/1991 | Kinoshita | 219/69.12 |
| 5,077,457 | 12/1991 | Onaka et al. | 219/69.12 |
| 5,302,796 | 4/1994 | Kuriki | 219/69.12 |
| 5,331,129 | 7/1994 | Aso et al. | 219/69.12 |

FOREIGN PATENT DOCUMENTS

| | | | |
|---|---|---|---|
| 2-48121 | 2/1990 | Japan | 219/69.12 |
| 92/19409 | 11/1992 | WIPO | 219/69.12 |

*Primary Examiner*—Geoffrey S. Evans
*Attorney, Agent, or Firm*—Lucas & Just

[57] ABSTRACT

An automatic wire threading device with a threading mechanism having a first free wheel and a second free wheel each having an inner traction surface and an outer traction surface. When a central processing unit (4) detects wire breakage, drives a pneumatic cylinder (25) against the action of a spring (22) that separates the free wheels so that pivoting arm (23) positions the wheel carried by it against the other wheel. The central processing unit then orders rotation of a threading motor which by a gear train drives the wire. A cutting mechanism cuts the wire to improve threading. A guide water circuit is provided downstream of the cutting mechanism.

5 Claims, 2 Drawing Sheets

AUTOMATIC WIRE-THREADING DEVICE FOR ELECTROEROSION MACHINES

Basically, there may be two cases of breakage: accidental or predetermined because work on a given zone/piece has ended and it is necessary to start it on another.

The wire, once broken, can be threaded completely/partially with human intervention, but in wire electroerosion machines, programmed to work even at night, the need for designing a mechanism that will thread the wire automatically and without human intervention has become apparent.

The present invention procures an automatic wire-threading device for electroerosion machines, characterized in that it consists of a traction threading mechanism which consists of:

a) a first and a second free wheel having an inner traction surface and an outer loose surface;

b) a pivoting arm bearing the second wheel that is acted upon by a fluid-mechanical means which, under normal conditions, separates the second wheel from the first wheel and under threading conditions puts them into contact for dragging the wire;

c) a threading motor which, in case of breakage, drives the first and second wheels by means of a gear train;

it likewise consists of a cutting mechanism and fine-jet guide water circuit, all the drive means being controlled by a central CPU.

DETAILED DESCRIPTION

Figure 1:
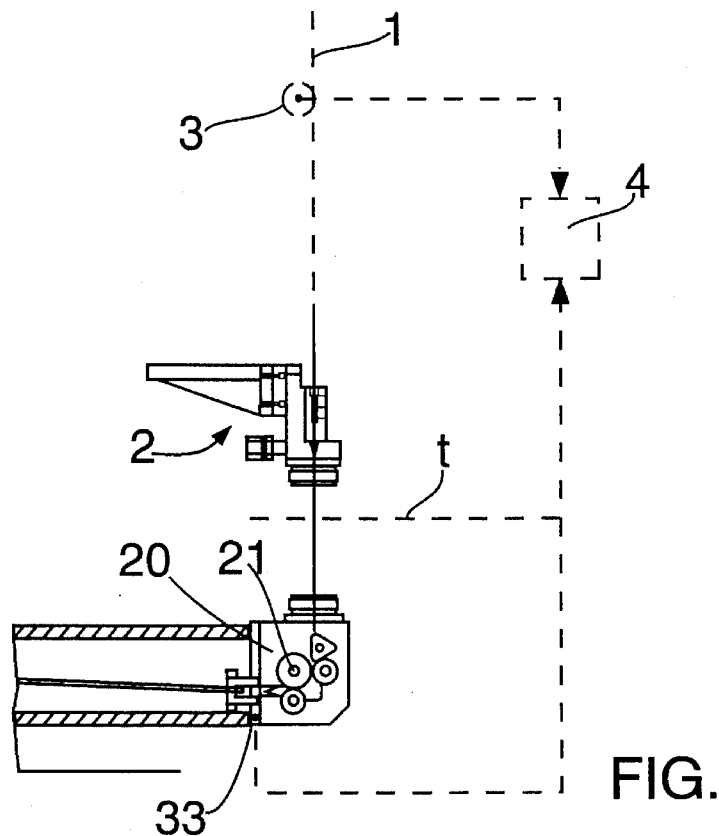
FIG. 1 is a schematic view of the path of the wire.

The wire (1) for electroerosion comes from upstream to the upper head (2), passing over a wheel (3) which drives a coil or dynamo (not represented) whose current is captured by a central CPU (4) (FIG. 1) which controls all the drives of the threading mechanisms that will be described.

Figure 2:
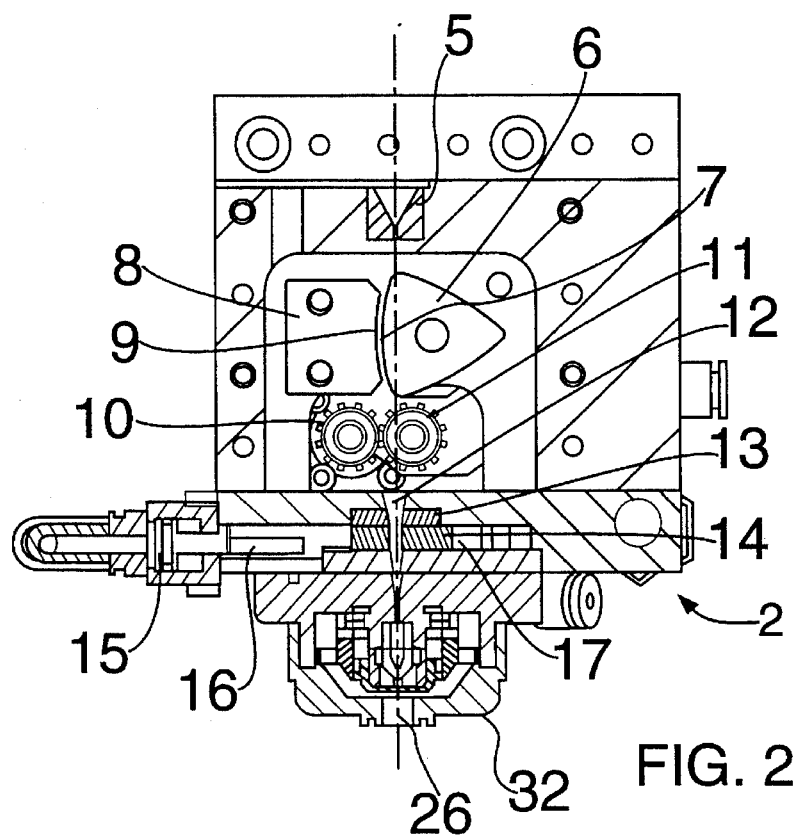
FIG. 2 is a sectional view of the upper head as part of the threading device, subject of the invention.

In FIG. 2 it can be seen that the wire (1) is introduced into the upper head (2) through a funnelled guide (5) of, for example, ceramic, to discharge into a current tap (6) which preferably will be of tungsten carbide, polygonal in shape and with convex sides to improve contact.

The polygonal shape is to improve the service life of the tap (6), since after one side (7) wears, the tap (6) can be turned and another one of its sides presented as the guide contact.

Facing the tap (6) there is provided a guide plate (8), limiting the movement of the wire (1), whose wall (9) facing the tap (6) is matched to the latter, i.e., is concave.

If the wire (1) is working normally, it passes from the tap (6) to the outlets (12) and by means of the corresponding guides emerges from the upper head (2), passes to the workpiece (t) and continues to the lower head (20). In case of breakage, the threading device goes into operation, beginning with the traction threading mechanism.

The traction threading mechanism consists of two free wheels (10), (11) which have the property of having the inner surface driven and the outer surface loose. In the normal situation these two wheels are separated from one another.

Figure 3:
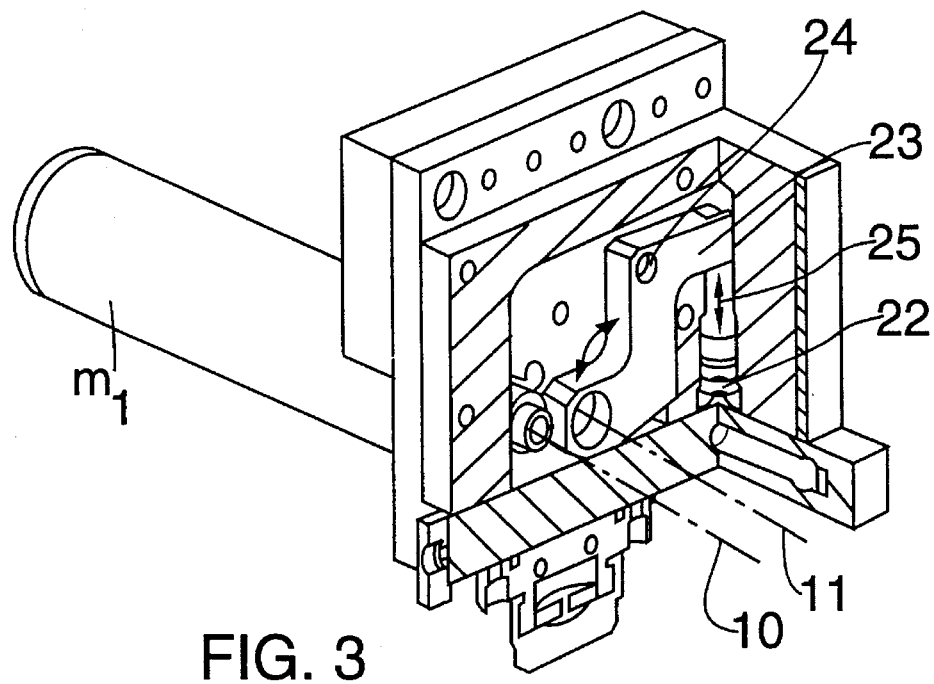
FIG. 3 is a view in partial section of the upper elements of the upper head of FIG. 2.

In the event of breakage of the wire (1), which in most cases occurs in the work zone (t), i.e., between the upper head (2) and the lower head (20) (FIG. 1), the main traction wheel (21) no longer drags the wire (1), as a result of which the wheel (3) has no movement, and the associated dynamo does not generate current therefor. This is detected by the CPU (4) which orders (FIG. 3) drive of the pneumatic cylinder (25), against the action of the spring (22) separating the free wheels (10), (11) (FIG. 2), which, by means of the arm (23) that pivots on the shaft (24), positions the wheel (11) carried by it, facing the other free wheel (10).

The CPU (4) likewise orders action of the threading motor ($m_1$).

For movement of the free wheels (10), (11) there is provided a threading motor ($m_1$) which, by means of a gear train, drives the two free wheels (10), (11), thereby preventing the wire (1), upon emergence therefrom, from starting to become deformed, interfering with its conveyance or insertion into the various elements downstream.

The cutting mechanism controlled by the CPU (4) cuts the wire (1) and gives rise to a residue of wire between the said mechanism and the breakage zone, which has to be removed.

Figure 4:
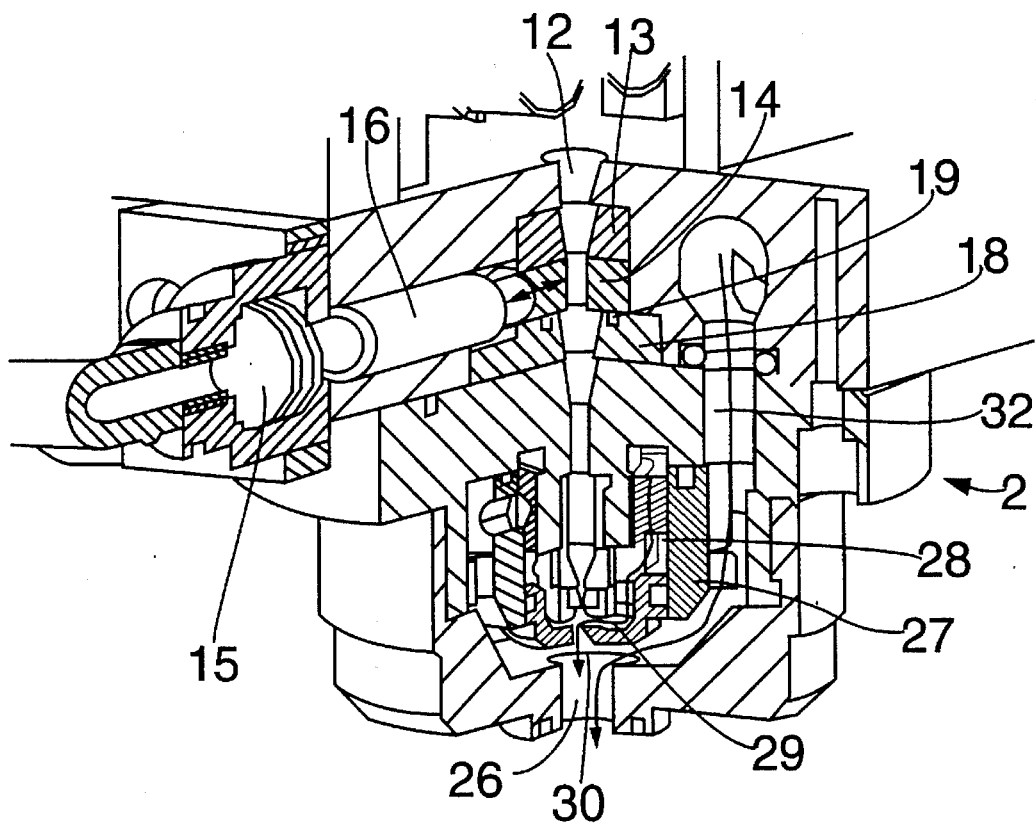
FIG. 4 is a perspective view of two semisections at 90° of the lower part of the upper head of FIG. 2.

The cutting mechanism consists of a fixed upper blade (13) and a lower blade (14) driven by a pneumatic cylinder (15) with a guided transmission shaft (16) and a return spring (17) of opposite action on said lower blade (14) (FIGS. 2 and 4). It likewise consists of a pressing cover (18) with a toroidal recess (19), facing the lower blade (14) underneath, and to which compressed air is supplied to form a cushion pressing the lower blade (14) against the upper blade (13) and improving cutting.

The mouths for the wire (1) are funnelled, except in the lower blade (14), which is cylindrical to facilitate cutting.

On emergence from cutting there is provided a guide nozzle (27) which consists of an internal water conduit (28) with a narrowing (29) in its outlet for the general conveyance of the wire (1), giving rise to a fine jet of water (30) which guides the wire (1) to the mouth of the outlet (26) of the upper head (2).

In the upper head (2) there is provided internally between the conduits for the wire (1) and the outside, a water conduit (32) which discharges into the outlet (26) and which performs cleaning and cooling functions.

Likewise provided is a detector (33) of the presence of wire (1) downstream of the traction wheel (21).

If after a break, the CPU (4), once having given the orders for putting the threading device into operation, fails to receive a signal from the detector (33), it would give new orders to commence the operations described.

I claim:

1. Automatic wire-threading device for electroerosion machines having an upper head and a lower head and a wire that travels from the upper head to the lower head, characterized in that said device comprises a traction threading mechanism comprising:

a) a first free wheel and a second free wheel, each of the wheels having an inner traction surface and an outer loose surface;

b) a pivoting arm bearing the second wheel;

c) a fluid mechanical means for reversibly moving the pivoting arm and the second wheel from a first position to a second position in which the second wheel is in contact with the first wheel for dragging said wire;

d) a threading motor which, under threading conditions, drives the first and second wheels by a gear train;

e) a cutting mechanism and a fine-jet guide water circuit;

f) a central processing unit controlling the pivoting arm, the threading motor, and the cutting mechanism.

2. Automatic wire-threading device for electroerosion machines, according to claim 1, characterized in that the cutting mechanism consists of a fixed upper blade, a lower blade movable under the effect of a second fluid-mechanical means and a pressing cover with an upper toroidal groove provided below the lower blade, wherein an air cushion is created between the two blades.

3. Automatic wire-threading device or electroerosion machines, according to claim 1, characterized in that it consists of a current tap, polygonal in shape, with convex sides facing a limiting guide whose face facing the tap is concave.

4. Automatic wire-threading device for electroerosion machines, according to claim 1, characterized in that the guide water circuit is provided downstream of the cutting mechanism.

5. Automatic wire-threading device for electroerosion machines, according to claim 1, characterized in that downstream of a main traction wheel, there is provided a detector for the presence of the wire and upstream of the upper head there is provided a coil associated with the movement of the wire, the detector and the coil serving as sensors for the central processing unit.

* * * * *

UNITED STATES PATENT AND TRADEMARK OFFICE
CERTIFICATE OF CORRECTION

PATENT NO. : 5,471,025
DATED : November 28, 1995
INVENTOR(S) : Jose M. Onandia

It is certified that error appears in the above-indentified patent and that said Letters Patent is hereby corrected as shown below:

Column 3, line 15 (claim 3), change "or" to --for--.

Signed and Sealed this

Twenty-sixth Day of March, 1996

Attest:

BRUCE LEHMAN

Attesting Officer

Commissioner of Patents and Trademarks